(12) United States Patent
Wilson (10) Patent No.: US 10,107,326 B2
(45) Date of Patent: Oct. 23, 2018

(54) ANTI-LOOSENING INCREMENTAL TENSION FASTENER ASSEMBLY

(71) Applicant: Maclean-Fogg Company, Mundelein, IL (US)

(72) Inventor: Larry J. Wilson, Commerce Township, MI (US)

(73) Assignee: MacLean-Fogg Company, Mundelein, IL (US)

( * ) Notice: Subject to any disclaimer, the term of this patent is extended or adjusted under 35 U.S.C. 154(b) by 51 days.

(21) Appl. No.: 15/346,953

(22) Filed: Nov. 9, 2016

(65) Prior Publication Data

US 2017/0138391 A1 May 18, 2017

Related U.S. Application Data

(60) Provisional application No. 62/254,276, filed on Nov. 12, 2015.

(51) Int. Cl.
*F16B 39/24* (2006.01)
*F16B 39/282* (2006.01)

(52) U.S. Cl.
CPC ............ *F16B 39/24* (2013.01); *F16B 39/282* (2013.01)

(58) Field of Classification Search
CPC ......... F16B 39/22; F16B 39/282; F16B 39/24
USPC .................. 411/138, 145, 149, 155, 538
See application file for complete search history.

(56) References Cited

U.S. PATENT DOCUMENTS

| | | | |
|---|---|---|---|
| 3,438,416 A | 4/1969 | Thurston | |
| 3,540,509 A * | 11/1970 | Gutshall | F16B 39/24 411/134 |
| 4,362,449 A * | 12/1982 | Hlinsky | B60B 3/145 411/156 |
| 5,190,423 A * | 3/1993 | Ewing | F16B 39/282 411/134 |
| 5,203,656 A * | 4/1993 | McKinlay | F16B 39/24 411/149 |
| 5,626,449 A * | 5/1997 | McKinlay | F16B 39/282 411/136 |
| 5,626,499 A | 5/1997 | McKinlay | |
| 6,776,565 B2 * | 8/2004 | Chang | F16B 39/282 411/136 |
| 7,497,652 B2 * | 3/2009 | Lin | F16B 39/24 411/132 |
| 2002/0039522 A1 | 4/2002 | Hartmann et al. | |
| 2004/0170485 A1 | 9/2004 | Wilson | |
| 2006/0110232 A1 | 5/2006 | Wilson | |

(Continued)

FOREIGN PATENT DOCUMENTS

| | | |
|---|---|---|
| GB | 907826 | 10/1962 |
| WO | WO 03/023235 A2 | 3/2003 |
| WO | WO 2003/023235 A3 | 3/2003 |

OTHER PUBLICATIONS

European Search Report from corresponding EP Application No. 16198448.9, dated Mar. 31, 2017, 9p.

*Primary Examiner* — Roberta S Delisle (74) *Attorney, Agent, or Firm* — Brinks Gilson & Lione (57) ABSTRACT

A fastener assembly comprising a threaded component and a washer, wherein the bearing surfaces between the threaded component and washer each include helically inclined surface segments such that the clamp load exerted on the washer by the threaded component alternates between being increased and being decreased during rotation of the nut in a single direction.

20 Claims, 8 Drawing Sheets

(56) References Cited

U.S. PATENT DOCUMENTS

| | | | |
|---|---|---|---|
| 2006/0216129 A1* | 9/2006 | Lin | F16B 39/282 |
| | | | 411/161 |
| 2007/0128003 A1* | 6/2007 | Shiu | F16B 39/282 |
| | | | 411/533 |
| 2007/0243040 A1* | 10/2007 | Chen | F16B 39/282 |
| | | | 411/161 |
| 2010/0303580 A1* | 12/2010 | Lin | F16B 39/282 |
| | | | 411/198 |
| 2014/0017028 A1 | 1/2014 | McKinlay | |
| 2014/0348609 A1* | 11/2014 | Chen | F16B 39/282 |
| | | | 411/209 |

\* cited by examiner

ANTI-LOOSENING INCREMENTAL TENSION FASTENER ASSEMBLY

RELATED APPLICATIONS

The present patent document claims the benefit of the filing date under 35 U.S.C. § 119(e) of Provisional U.S. Patent Application Ser. No. 62/254,276, filed Nov. 12, 2015, which is hereby incorporated by reference.

FIELD

The embodiments relate generally to a threaded fastener, and more particularly to a threaded fastener assembly that can provide incremental tension or clamp load and resistance to loosening.

BACKGROUND

Traditional anti-loosening threaded fasteners rely on features that oppose loosening torque force that exist in the fastener's application. Prevailing torque designs employ mechanical means in the threads to increase the amount of torque force required to loosen or remove the fastener, thereby opposing the aforementioned loosening torque force. This mechanical means can be distorted threads, non-metallic coating that covers some of the thread surface, or an additional plastic component, all of which add friction to oppose loosening torque. Prevailing torque fasteners have short re-use lives, with typical service policy being to replace the disassembled fastener with a new one upon reassembly. Another disadvantage of this fastener is that variation in prevailing torque results in added variation in the joint clamp load.

Some designs employ features on the fastener's clamping surface. These features are typically directional in nature and can be characterized as being "teeth" that "bite" or "dig" into the opposing clamped surface, thus raising the required torque force to loosen the fastener. The disadvantage with this fastener is the damage created to the mating surface by disassembly.

Other designs require drilling a hole in the male threaded fastener and using a castellated nut, which has slot across each pair of opposing flats and requires lining up a slot with the hole in the male fastener and installing a cotter pin to prevent loosening. The primary disadvantage of this type of design is cost.

Some designs that eliminate many of the disadvantages of the above described types of fasteners work effectively for those applications that are subjected to vibration or cyclic loading that stretches and relaxes the male fastener, as on an automotive wheel fastening application. However, if use of the clamped joint involves rotation of the assembly around the fastener's axis, such as on an automotive wheel spindle, the loosening torque that is generated by inertia in the starting and stopping of rotation prevents such designs from providing utility.

BRIEF SUMMARY

In one embodiment, a fastener assembly comprises a torquing member and a clamping member assembled on a common axis, where the torquing member comprises threads formed around the axis and an annular bearing surface extending around the axis on one end, the clamping member comprises an annular bearing surface formed around the axis on one end and facing the torquing member bearing surface, the annular bearing surface on the torquing member includes a plurality of helically inclined surface segments, where the surface segments include a first pitch that is greater than a pitch on the threads and the surface segments include a second pitch with opposite incline relative to the threads, and the annular bearing surface on the clamping member includes a plurality of helically inclined surface segments, where the surface segments include a third pitch that is greater than the pitch on the threads and the surface segments include a fourth pitch with opposite incline relative to the threads.

In another embodiment, a fastener assembly comprises a torquing member and a clamping member assembled on a common axis, the torquing member comprises threads that are provided with a predetermined pitch and that are located around the axis and an annular bearing surface extending around the axis on one end, the clamping member comprises an annular bearing surface extending around the axis on one end and facing the torquing member bearing surface, the annular bearing surface on the torquing member comprises a first series of helically inclined surface segments and a second series of helically inclined surface segments, where the surface segments of the first series are provided with a pitch that is greater than the predetermined pitch on the threads and the surface segments of the second series are provided with a pitch that is different than the predetermined pitch and inclined in the opposite direction, and the annular bearing surface on the clamping member comprises a third series of helically inclined surface segments and a fourth series of helically inclined surface segments, where the surface segments of the third series are provided with a pitch that is substantially greater than the predetermined pitch on the threads, and the surface segments of the fourth series are provided with a pitch that is different than the predetermined pitch and inclined in the opposite direction.

In another embodiment, a fastener assembly comprises a bolt with a head and a shaft and a washer assembled on the shaft, the bolt comprises threads formed around a portion of the shaft, the head comprises a plurality of helically inclined surface segments located on an underside of the head, where the surface segments include a first pitch that is greater than a pitch on the threads and the surface segments include a second pitch with opposite incline relative to the threads, and the washer comprises a bearing surface facing the underside of the head, the washer bearing surface comprises a plurality of helically inclined surface segments, where the surface segments include a third pitch that is greater than the pitch on the threads and the surface segments include a fourth pitch with opposite incline relative to the threads.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE DRAWINGS

Figure 1A:
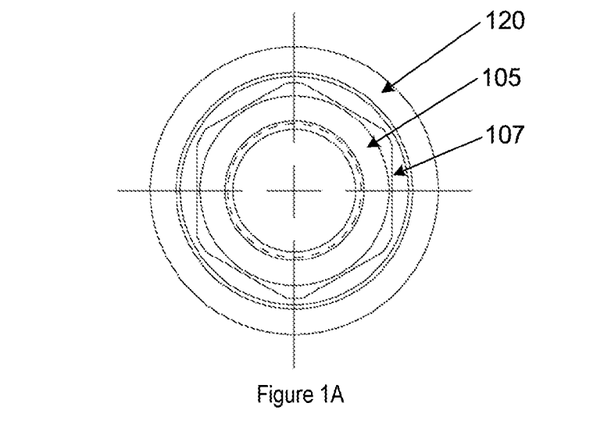
FIG. 1 is a top, cross-sectional side, and bottom view of a first fastener assembly.
Figure 1B:
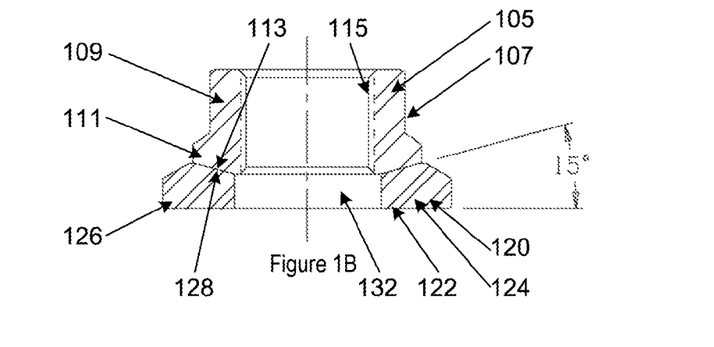
Figure 1C:
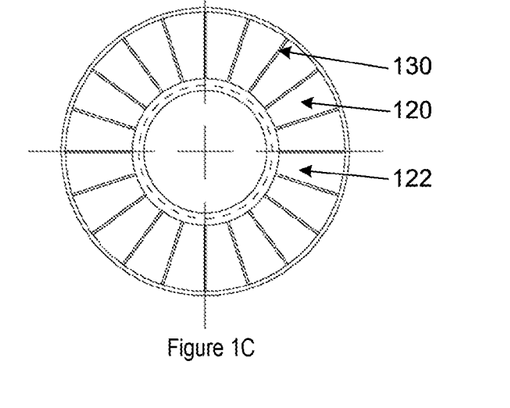

One embodiment of a fastener assembly is depicted in FIG. 1. The exemplary fastener assembly 100 comprises a nut 105 and a washer 120. FIG. 1A shows a top view of fastener assembly 100. FIG. 1B shows a cross-sectional side view of fastener assembly 100. FIG. 1C shows a bottom view of fastener assembly 100. Fastener assembly 100 may be a configuration which could be employed as a spindle nut fastened to a vehicle wheel spindle (not shown). As such, fastener assembly 100 may include a hex-shaped head 107 and a flat base 122. The hex-shaped head 107 is formed on the nut 105. The flat base 122 is formed on the washer 120. Any other shaped heads for nut 105 may be used, as required for the application of the embodiment. Any other shaped bases, such as frusto-conical, for washer 120 may be used, as required for the application of the embodiment.

The nut 105 includes a nut body 109 which includes the hex-shaped head 107 and an annular flange 111. The nut body 109 is internally threaded (not shown) at 115 in a conventional manner. The threads 115 extend helically around the inside of the nut body 109 on a conventionally selected pitch X.

The annular flange 111 has an annular bottom bearing surface 113 which is generally undulated. As shown in FIG. 3C, the bearing surface 113 is segmented so as to define sixteen left hand helically inclined surface segments 113L and sixteen right hand helically inclined surface segments 113R. The number of left hand helically inclined surface segments 113L and right hand helically inclined surface segments 113R may be any value, as required for the application of the embodiment. A larger number of helically inclined surface segments will result in a lower incremental increase of clamp load and tension per rotation of nut 105 and a lower resistance to loosening. A smaller number of helically inclined surface segments will result in a higher incremental increase of clamp load and tension per rotation of nut 105 and a higher resistance to loosening. The number of helically inclined surface segments may be selected per application to achieve a desired incremental increase of clamp load and tension per rotation of nut 105 and resistance to loosening.

Figure 2A:
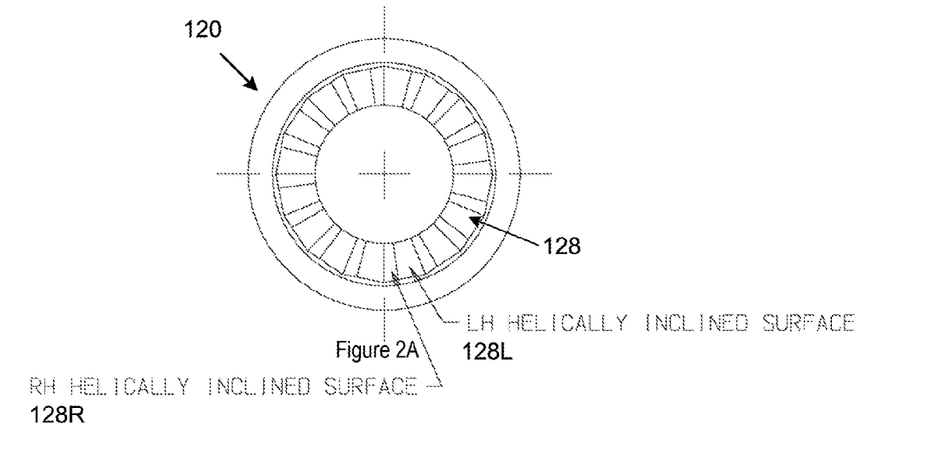
FIG. 2 is a top, cross-sectional side, and bottom view of a washer for use with the first fastener assembly of FIG. 1.
Figure 2B:
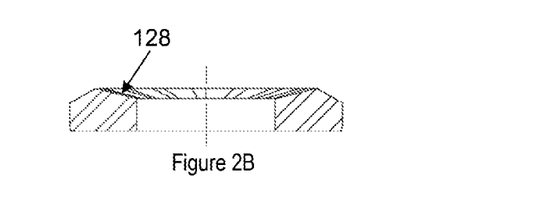

The washer 120 includes a washer body 124 which includes the flat base 122 and an annular flange 126. The washer body 124 has an unthreaded bore 132 through it. The annular flange 126 has an annular top bearing surface 128 which is generally undulating. As shown in FIGS. 2A and 2B the bearing surface 128 is segmented so as to define sixteen left hand helically inclined surface segments 128L and sixteen right hand helically inclined surface segments 128R. The number of left hand helically inclined surface segments 128L and right hand helically inclined surface segments 128R may be any value, as required for the application of the embodiment.

The interface of annular bottom bearing surface 113 of nut 105 and annular top bearing surface 128 of washer 120 may be at an angle with respect to base 122 of washer 120. The angle may be approximately 15 degrees, as shown in FIG. 1B. The angle at the interface of annular bottom bearing surface 113 of nut 105 and annular top bearing surface 128 of washer 120 may be any value from approximately zero to approximately forty-five degrees, as required for the application of the embodiment. The angle may be varied in order to evenly distribute loads through the washer 120 to the clamped surface (not shown). The friction at the interface of annular bottom bearing surface 113 of nut 105 and annular top bearing surface 128 of washer 120 may be varied to ensure the nut 105 can rotate relative to washer 120.

Figure 2C:
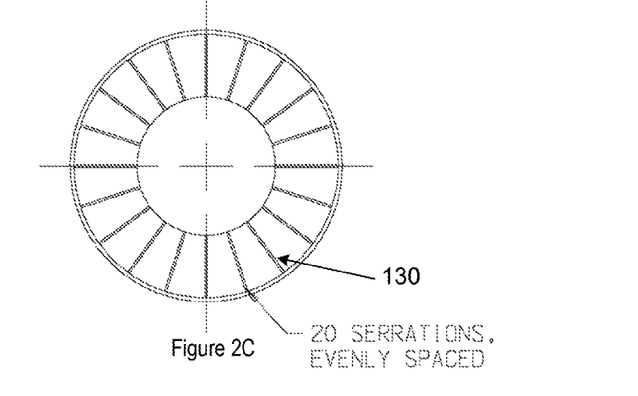

Base 122 of washer 120 may include multiple raised serration segments 130, for example twenty serration segments 130, as shown in FIGS. 1C and 2C. Serration segments 130 may bite or dig into the clamped surface (not shown). Serration segments 130 may increase the friction between base 122 of washer 120 and the clamped surface in order to prevent washer 120 from rotating relative to the clamped surface. Serration segments 130 may be spaced apart evenly on base 122 in order to provide uniform friction between base 122 and the clamped surface. The number and spacing of serration segments 130 may be adjusted in order to vary the friction between base 122 and the clamped surface. The friction between base 122 of washer 120 and the clamped surface may be greater than the friction at the interface of annular bottom bearing surface 113 of nut 105 and annular top bearing surface 128 of washer 120 in order to allow the nut 105 to rotate relative to the washer 120 but not let washer 120 rotate relative to the clamped surface. Accordingly, as torque is applied to nut 105, nut 105 may rotate while washer 120 remains stationary.

Referring to FIG. 2, FIG. 2A shows a top view of washer 120. FIG. 2B shows a cross-sectional side view of washer 120. FIG. 2C shows a bottom view of washer 120. FIGS. 2A and 2B show left hand helically inclined surface segments 128L and right hand helically inclined surface segments 128R on bearing surface 128.

Each left hand helically inclined surface segment 128L may account for the corresponding degrees of the rotational path of bearing surface 128, for example approximately 15 degrees. The amount of the rotational path of bearing surface 128 accounted for by each left hand helically inclined surface segment 128L may be any other value, as required by the application of the embodiment. Each right hand helically inclined surface segment 128R may account for approximately 7.5 degrees of the rotational path of bearing surface 128. The amount of the rotational path of bearing surface 128 accounted for by each right hand helically inclined surface segment 128L may be any other value, as required by the application of the embodiment. The total of surface segments 128L and 128R account for the total 360 degree path of the surface 128. The total number of surface segments 128L and 128R on the washer 120 is equal to the total number of surface segments 113L and 113R on the nut 105.

Each of the right hand surface segments 128R are formed so that they extend helically about the same axis as that of the threads 115 on the nut 105. Each surface 128R is, in turn, helically inclined and in the same direction as the threads 115. The pitch of each of these right hand helical inclined surfaces 128R is Y. Pitch Y of right hand helical inclined surfaces 128R is different and greater than pitch X of threads 115 on the nut 105. Pitch Y being different and greater than pitch X may allow washer 120 to resist loosening, such as when torque is applied in the counterclockwise direction. The direction of rotation of tightening and loosening the fastener assembly 100 may vary depending on the application of the embodiment.

Each of the left hand surface segments 128L, on the other hand, lie on the surface of a helix inclined in the opposite direction of the right hand surface segments 128R. The pitch of each of these left hand helical inclined surfaces 128L is Z. The pitch Z is selected to provide a predetermined tension increase for each degree (torque angle) of rotation of the nut 105 as it rotates through the 15 degrees occupied by each surface segment 128L.

Figure 3A:
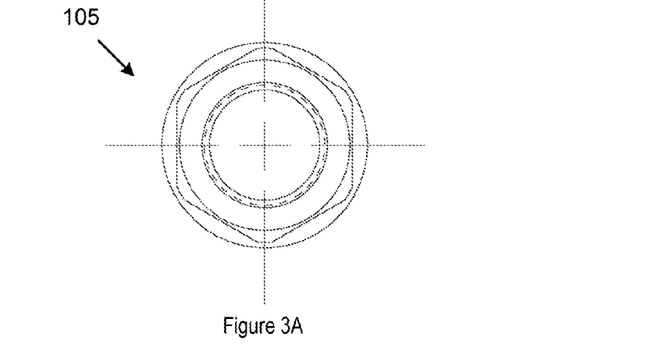
FIG. 3 is a top, cross-sectional side, and bottom view of a nut for use with the first fastener assembly of FIG. 1.
Figure 3B:
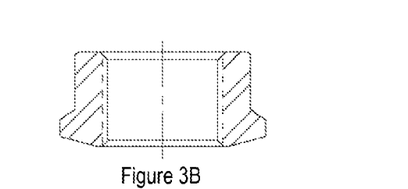
Figure 3C:
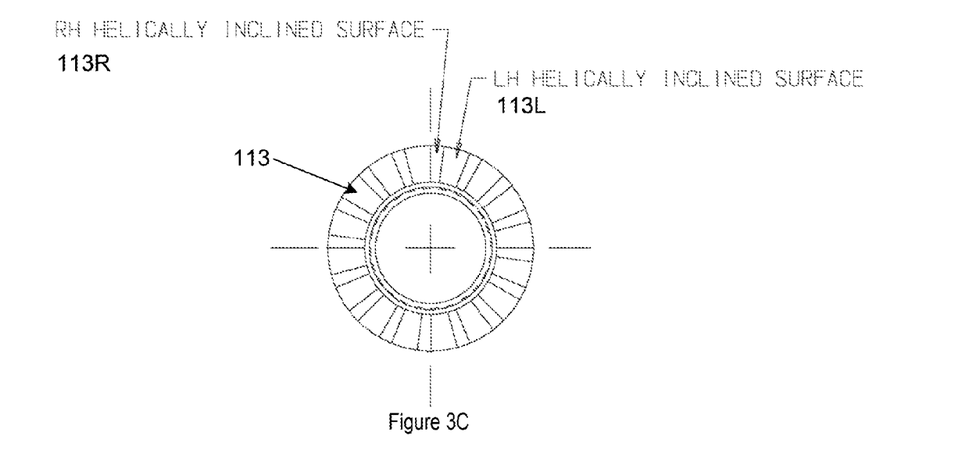

Referring to FIG. 3, FIG. 3A shows a top view of nut 105. FIG. 3B shows a cross-sectional side view of nut 105. FIG. 3C shows a bottom view of nut 105. FIG. 3C shows left hand helically inclined surface segments 113L and right hand helically inclined surface segments 113R on bearing surface 113.

Each left hand helically inclined surface segment 113L may account for approximately 15 degrees of the rotational path of bearing surface 113. The amount of the rotational path of bearing surface 113 accounted for by each left hand helically inclined surface segment 113L may be any other value, as required by the application of the embodiment. Each right hand helically inclined surface segment 113R may account for approximately 7.5 degrees of the rotational path of bearing surface 113. The amount of the rotational path of bearing surface 113 accounted for by each right hand helically inclined surface segment 113L may be any other value, as required by the application of the embodiment. The total of surface segments 113L and 113R account for the total 360 degree path of the surface 113. The total number of surface segments 113L and 113R on the nut 105 is equal to the total number of surface segments 128L and 128R on the washer 120.

Each of the right hand surface segments 113R are formed so that they extend helically about the same axis as that of the threads 115. Each surface 113R is, in turn, helically inclined and in the same direction as the threads 115. The pitch of each of these right hand helical inclined surfaces 113R is Y. Pitch Y of right hand helical inclined surfaces 113R is different and greater than pitch X of threads 115. Pitch Y being different and greater than pitch X may allow nut 105 to resist loosening, such as when torque is applied in the counterclockwise direction. The direction of rotation of tightening and loosening the fastener assembly 100 may vary depending on the application of the embodiment. The pitch Y of right hand helical inclined surfaces 113R may be the same as or complimentary to the pitch Y of right hand helical inclined surfaces 128R on the washer 120.

Each of the left hand surface segments 113L, on the other hand, lie on the surface of a helix inclined in the opposite direction of the right hand surface segments 113R. The pitch of each of these left hand helical inclined surfaces 113L is Z. The pitch Z is selected to provide a predetermined tension increase for each degree (torque angle) of rotation of the nut 105 as it rotates through the approximately 15 degrees occupied by each surface segment 113L. The pitch Z of left hand helical inclined surfaces 113L may be the same as or complimentary to the pitch Z of left hand helical inclined surfaces 128L on the washer 120.

Figure 4:
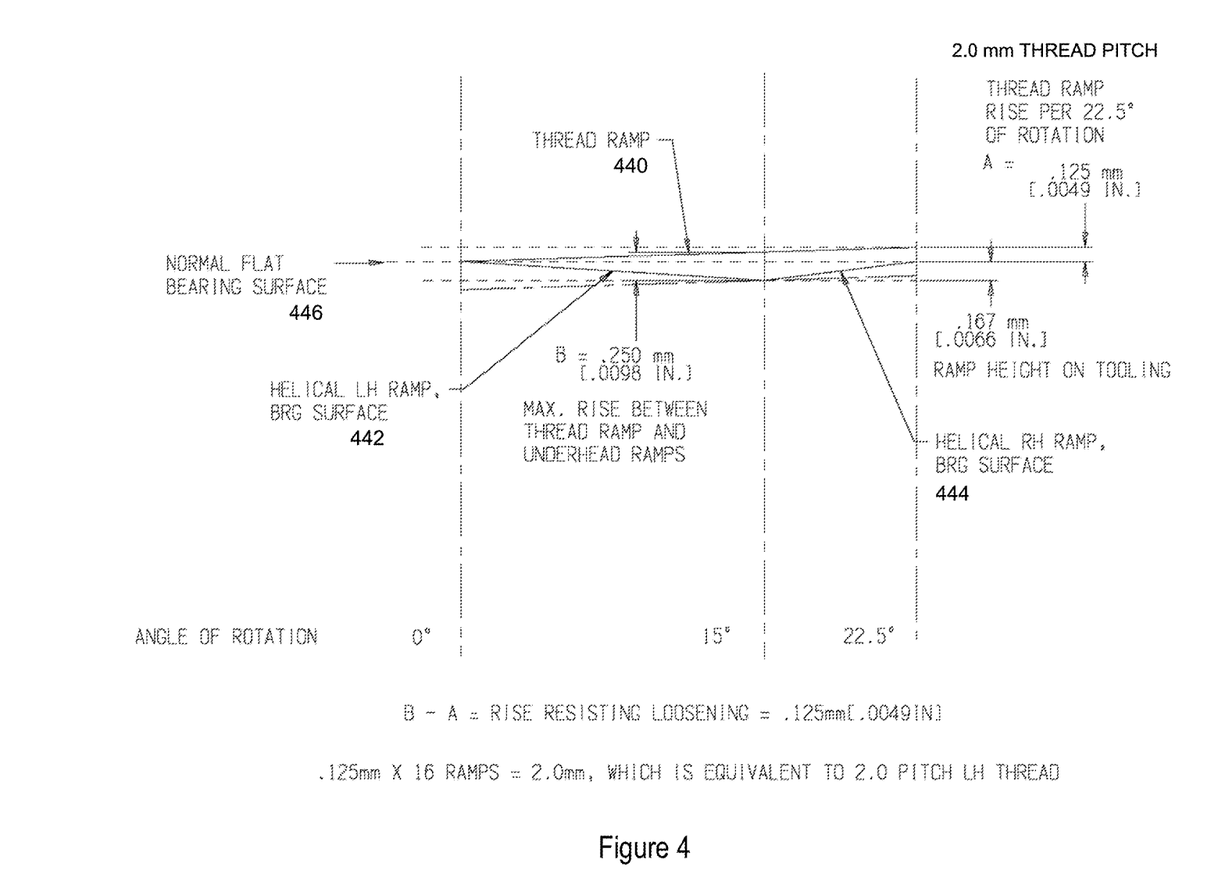
FIG. 4 is an illustration of an exemplary thread arrangement for use with a fastener assembly.

FIG. 4 depicts an illustration of an exemplary thread arrangement for use with fastener assembly 100. The values listed in FIG. 4 are exemplary and may be varied based on the application of the embodiment. FIG. 4 shows thread ramp 440, left hand helical inclined surface ramp 442, and right hand helical inclined surface ramp 444 relative to an angle of rotation of fastener assembly 100. Left hand helical inclined surface ramp 442 may be used with any of the left hand helical inclined surfaces 113L or 128L on nut 105 or washer 120. Right hand helical inclined surface ramp 444 may be used with any of the right hand helical inclined surfaces 113R or 128R on nut 105 or washer 120. The ramps are shown relative to a flat bearing surface 446, which may be the same as flat base 122 on washer 120.

As shown in FIG. 4, left hand helical inclined surface ramp 442 has a pitch that is in the opposite direction of the pitch of thread ramp 440. Also shown in FIG. 4, right hand helical inclined surface ramp 444 has a pitch in the same direction as thread ramp 440, but right hand helical inclined surface ramp 444 has pitch that is different and greater than thread ramp 440. As explained in FIG. 4, right hand helical inclined surface ramp 444 rises 0.167 mm for every 7.5 degrees of rotation, whereas thread ramp 440 rises 0.125 mm for every 22.5 degrees of rotation. Accordingly, right hand helical inclined surface ramp 444 has a greater pitch than thread ramp 440. The difference in the value of the pitch of right hand helical inclined surface ramp 444 and the pitch of thread ramp 440 provides the resistance to loosening of the fastener assembly 100 upon counterclockwise rotation. A larger difference will result in larger resistance to loosening and a smaller difference will result in a smaller resistance to loosening.

Figure 5:
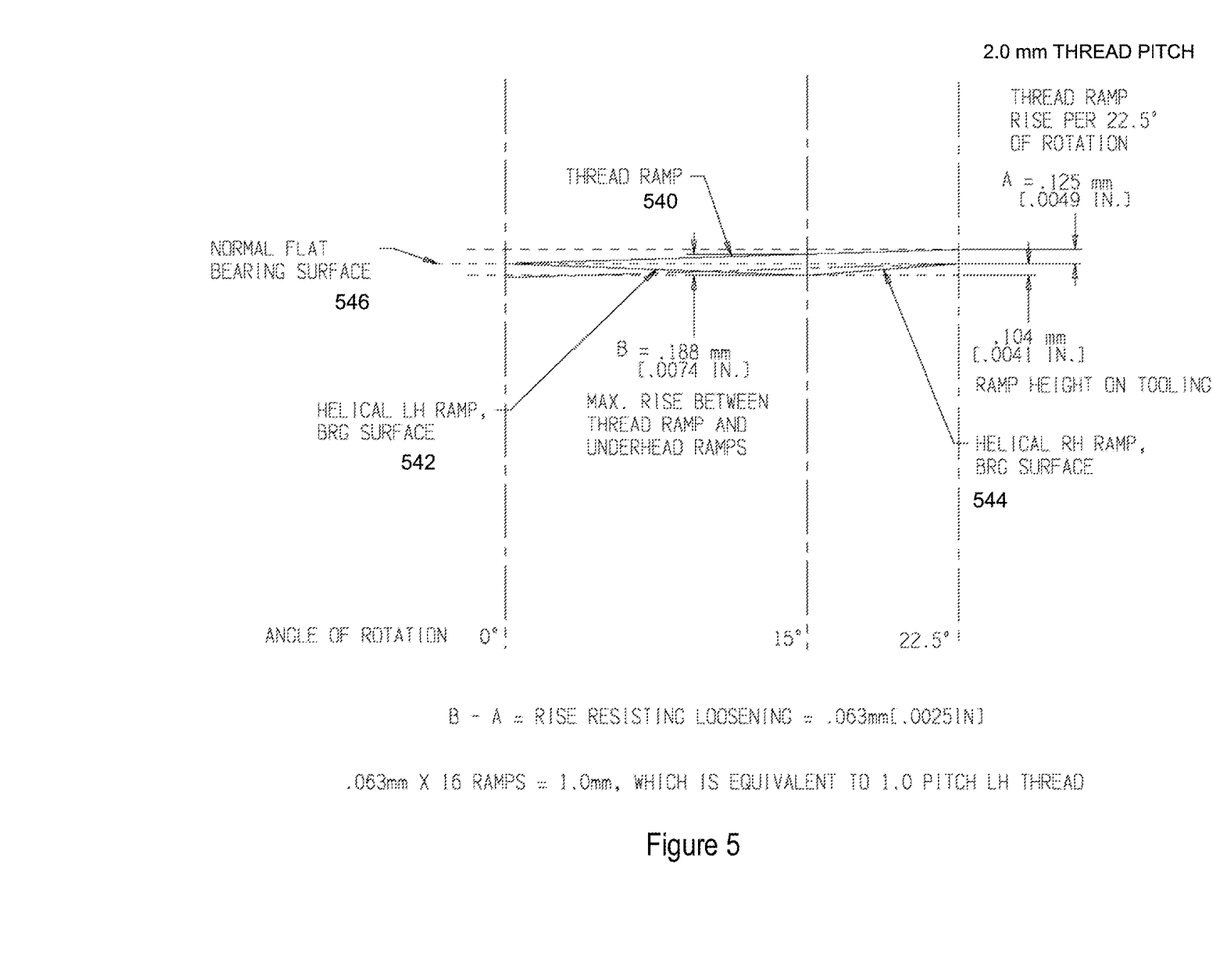
FIG. 5 is an illustration of an exemplary thread arrangement for use with a fastener assembly.

FIG. 5 depicts an illustration of another exemplary thread arrangement for use with fastener assembly 100. The values listed in FIG. 5 are exemplary and may be varied based on the application of the embodiment. Similar to FIG. 4, FIG. 5 shows thread ramp 540, left hand helical inclined surface ramp 542, and right hand helical inclined surface ramp 544 relative to an angle of rotation of fastener assembly 100. Left hand helical inclined surface ramp 542 may be used with any of the left hand helical inclined surfaces 113L or 128L on nut 105 or washer 120. Right hand helical inclined surface ramp 544 may be used with any of the right hand helical inclined surfaces 113R or 128R on nut 105 or washer 120. The ramps are shown relative to a flat bearing surface 546, which may be the same as flat base 122 on washer 120.

FIG. 5 is similar to FIG. 4 except for the ramp heights of left and right hand helical inclined surface ramps. A comparison of FIGS. 4 and 5 shows that the ramp height of left hand helical inclined surface ramp 542 is 0.104 mm, whereas the ramp height of left hand helical inclined surface ramp 442 is 0.167 mm. The smaller left hand ramp height depicted in FIG. 5 will allow the fastener assembly 100 to be tightened and increase clamp load with less rotational force for each incremental rotation than for the left hand ramp height depicted in FIG. 4 because the interference between the left hand helical inclined surfaces 113L and 128L on the nut 105 and washer 120 will be reduced. Similarly, the smaller right hand ramp height depicted in FIG. 5 will provide the fastener assembly 100 with less resistance to loosening for each incremental rotation of the fastener assembly 100 than for the right hand ramp height depicted in FIG. 4 because the interference between the right hand helical inclined surfaces 113R and 128R on the nut 105 and washer 120 will be reduced.

Figure 6:
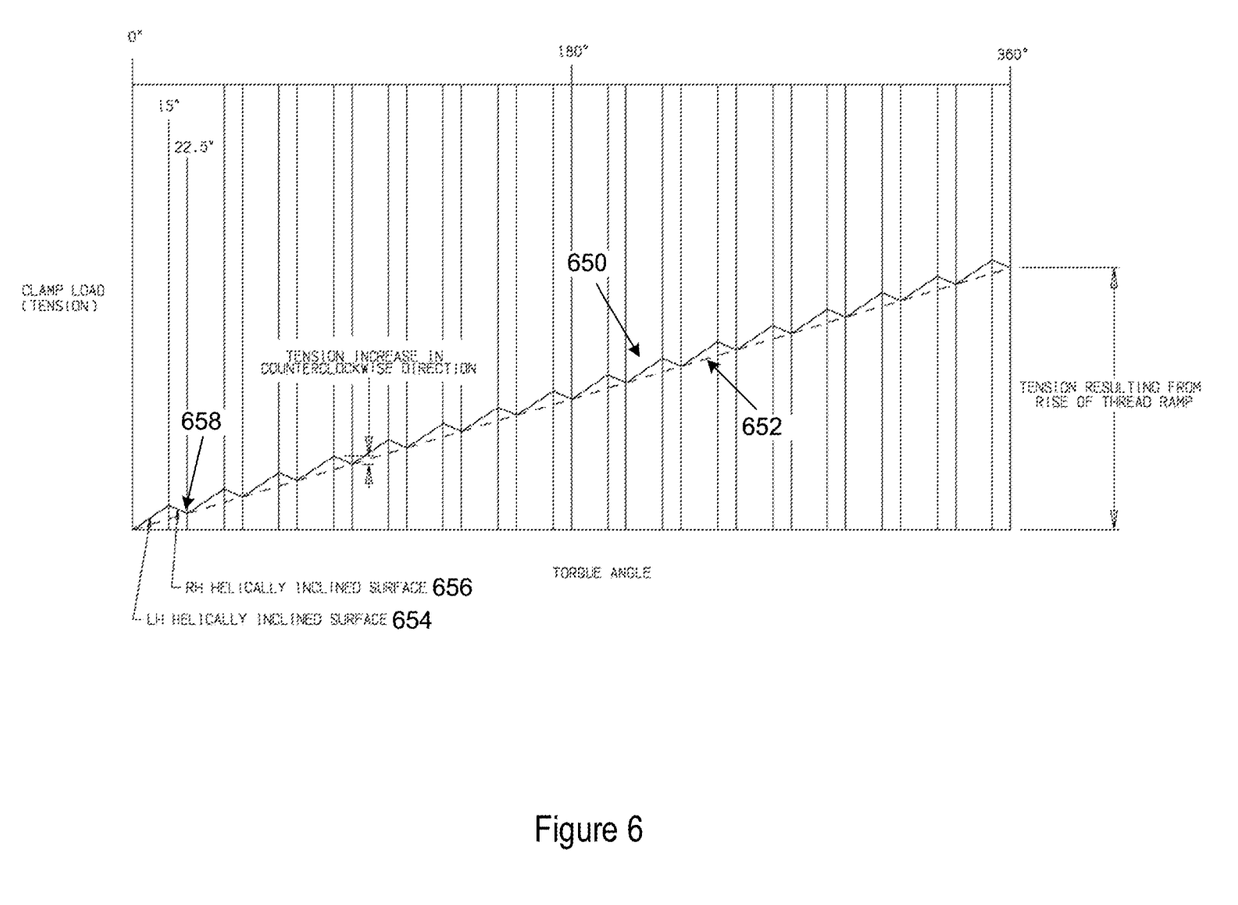
FIG. 6 is an illustration of an exemplary relationship between torque angle and clamp load during application of a fastener assembly.

FIG. 6 depicts an illustration of an exemplary relationship between torque angle and clamp load during application of fastener assembly 100. In FIG. 6, clockwise rotation results in an increase in torque angle. Line 650 shows the increase in clamp load (tension) for each degree of rotation of fastener assembly 100, which has left and right hand helically inclined surface segments, as previously described. Line 650 shows the increase in clamp load when all left and right hand helically inclined surface segments on nut 105 and washer 120 interact simultaneously. Dashed line 652 shows the increase in clamp load (tension) for each degree of rotation of a conventional fastener assembly. Segment 654 of line 650 shows the amount of clamp load increase when left hand helically inclined surface segments interact as fastener assembly is tightened in a clockwise direction. Accordingly, clockwise rotation of fastener assembly 100 engages contact between left hand helically inclined surface segments, which increases tension in a male threaded component inserted in fastener assembly 100. FIG. 6 shows that the amount of clamp load increase for segment 654 is greater than the clamp load increase for dashed line 652 for the same amount of torque angle increase.

Continued clockwise rotation of fastener assembly 100 transitions from contact between left hand helically inclined surface segments to contact between right hand helically inclined surface segments. The clamp load decreases and tension in a male threaded component decreases while the right hand helically inclined surfaces interact. Segment 656 of line 650 shows the change in clamp load when right hand helically inclined surface segments interact as fastener assembly is tightened in a clockwise direction. FIG. 6 shows that the clamp load decreases when right hand helically inclined surface segments interact. The decrease in clamp load is due to the pitch of the right hand helically inclined surface segments being greater than the pitch of the threads. Tightening of fastener assembly 100 in a clockwise direction decreases tension in the fastener as the right hand helically inclined surface segments interact. Tension decreases until the left hand helically inclined surface segments once again engage.

The amount of tension or clamping pressure is determined by the number of rotations the nut 105 makes and the pitch of the helically inclined surface segments. The clamping force desired can be achieved manually by counting segment passage or automatically by programming a computer driven torque wrench to do so.

Conversely, loosening of fastener assembly 100 in a counterclockwise direction increases tension in the fastener assembly 100 as the right hand helically inclined surface segments interact. The increase in tension as fastener assembly 100 rotates in a counterclockwise direction provides resistance to loosening torque that may be generated in the normal use of fastener assembly 100.

The resting position of fastener assembly 100 under load is when both the left hand and right hand helically inclined surfaces are in contact simultaneously. The resting positions 658 can be seen graphically in FIG. 6 at each local minimum point of line 650, for example at a torque angle of 22.5 degrees. Fastener assembly 100 will automatically reach a resting position because that is the position in which the least amount of stress is applied to a male threaded component, such as a bolt, inserted in fastener assembly 100. Accordingly, fastener assembly 100 is self-seating in its most desirable position.

Figure 7A:
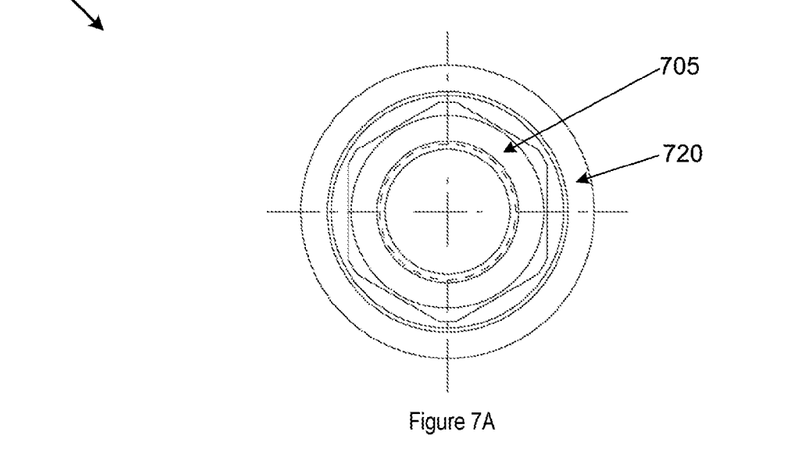
FIG. 7 is a top, cross-sectional side, and bottom view of a second fastener assembly.
Figure 7B:
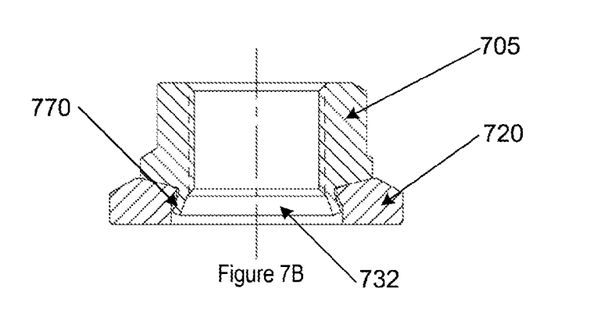
Figure 7C:
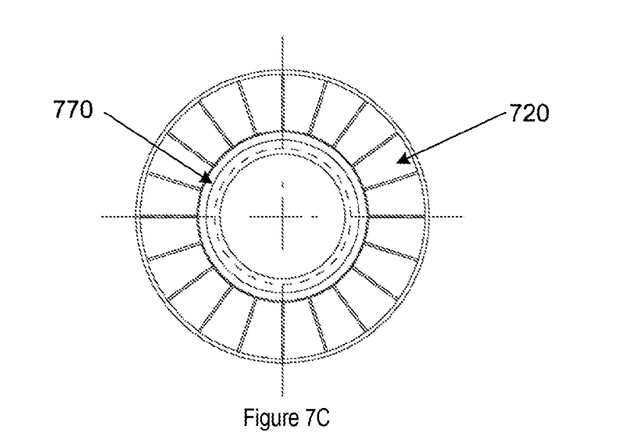

Another embodiment of a fastener assembly is depicted in FIG. 7. Fastener assembly 700 may include some or all of the same elements and features as fastener assembly 100, accordingly, they will not be repeated here. FIG. 7A shows a top view of fastener assembly 700. FIG. 7B shows a cross-sectional side view of fastener assembly 700. FIG. 7C shows a bottom view of fastener assembly 700. Fastener assembly 700 may include a captive washer 720 turnably connected to nut 705. The connection between washer 720 and nut 705 may allow free rotation between washer 720 and nut 705 while washer 720 is held to nut 705. The connection between washer 720 and nut 705 may be accomplished by a downward extending flared portion 770 of nut 705 that fits into bore 732 of washer 720, as shown in FIG. 7B. Bore 732 of washer 720 may be narrower at the top to match flare 770. The fastener assembly 700 includes the same resistance to loosening features of fastener assembly 100 due to the interaction of the left hand and right hand helically inclined surfaces of washer 720 and nut 705.

Figure 8A:
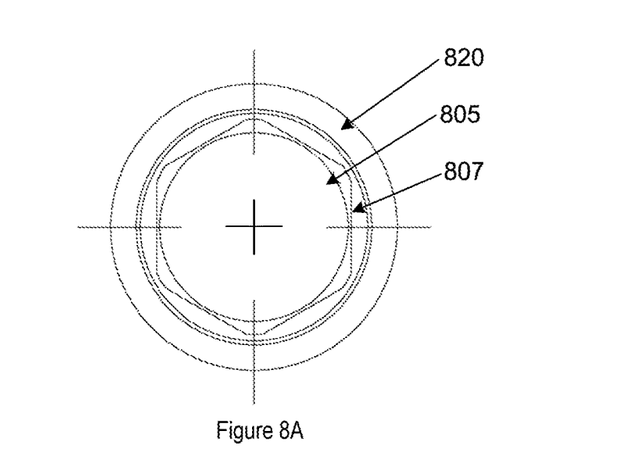
FIG. 8 is a top, cross-sectional side, and bottom view of a third fastener assembly.
Figure 8B:
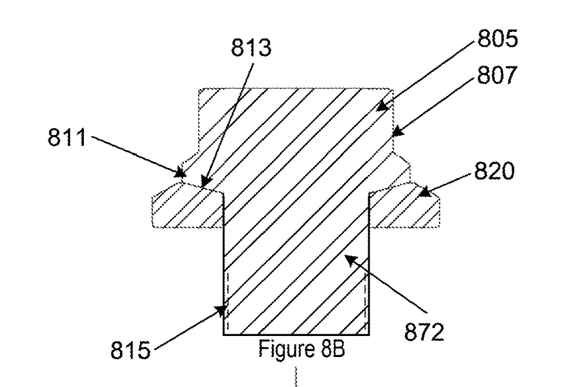
Figure 8C:
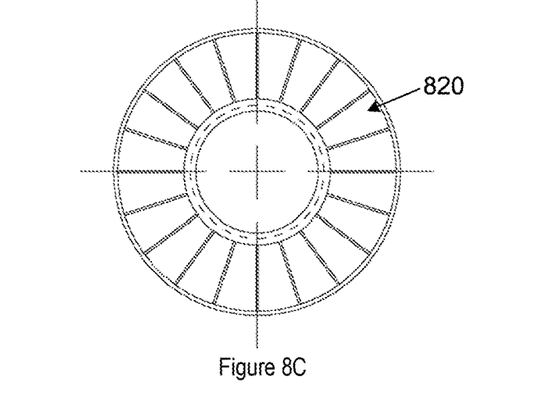

Another embodiment of a fastener assembly is depicted in FIG. 8. FIG. 8A shows a top view of fastener assembly 800. FIG. 8B shows a cross-sectional side view of fastener assembly 800. FIG. 8C shows a bottom view of fastener assembly 800. Fastener assembly 800 comprises a bolt 805 instead of a nut, as in fastener assembly 100. Bolt 805 may include some or all of the same elements and features as nut 105, such as hex-shaped head 807, threads 815, flange 811, bearing surface 813, left hand helically inclined surface segments and right hand helically inclined surface segments. Threads 815 may extend helically around the outside of a portion of the shaft 872 of bolt 805 on a selected pitch X. Fastener assembly 800 also comprises a washer 820. Washer 820 may include some or all of the same elements and features as washer 120, accordingly, they will not be repeated here. The fastener assembly 800 includes the same resistance to loosening features of fastener assembly 100 due to the interaction of the left hand and right hand helically inclined surfaces of washer 820 and bolt 805.

The fastener assembly embodiments described in this disclosure are able to provide resistance to loosening torque for applications where the clamped joint rotates around the fastener's axis, such as rotation of a male threaded component inserted in the fastener assembly. In such an application, the loosening torque that is generated by inertia in starting and stopping the rotation is counteracted by the tension increase that occurs when the right hand helically inclined surfaces interact.

The fastener assembly embodiments described in this disclosure provide an inexpensive fastener assembly to manufacture and use because only a nut and washer that have the requisite helically inclined surfaces are required, additional components are not necessary. Additionally, the fastener assemblies described are reusable because none of the components are permanently damaged when applying or removing the fastener assembly. Further, the fastener assemblies will not damage the clamping surface because there are no teeth that are directional in nature to bite into the clamping surface.

This disclosure has been described in the context of a nut and a bolt with a mating flat base washer. It should be understood, however, that it might also be applied to a wide range of fastener assembly configurations, including nut/bolt and conical washer assemblies, for example. While this invention has been particularly shown and described with references to embodiments thereof, it will be understood by those skilled in the art that various changes in form and details may be made therein without departing from the spirit and scope of the invention as defined by the appended claims.

I claim:

1. A fastener assembly comprising:
   a torquing member and a clamping member assembled on a common axis;
   the torquing member comprises threads formed around the axis and an annular bearing surface extending around the axis on one end;
   the clamping member comprises an annular bearing surface formed around the axis on one end and facing the torquing member bearing surface;
   the annular bearing surface on the torquing member includes a plurality of helically inclined surface segments, wherein the torquing member surface segments include a first pitch that is greater than a pitch on the threads and the torquing member surface segments include a second pitch with opposite incline relative to the threads; and
   the annular bearing surface on the clamping member includes a plurality of helically inclined surface segments, wherein the clamping member surface segments include a third pitch that is greater than the pitch on the threads and the clamping member surface segments include a fourth pitch with opposite incline relative to the threads.

2. The fastener of claim 1, wherein the torquing member comprises a first series of helically inclined surface segments, wherein the torquing member surface segments of the first series are provided with the first pitch; and
   the clamping member comprises a second series of helically inclined surface segments, wherein the clamping member surface segments of the second series are provided with the third pitch.

3. The fastener of claim 1, wherein the helically inclined surface segments on the torquing member and the clamping member are generally complementary in shape.

4. The fastener of claim 1, wherein the first pitch and the third pitch are inclined in the same direction as the pitch on the threads.

5. The fastener of claim 1, wherein the second pitch and the fourth pitch are different than the pitch on the threads.

6. The fastener of claim 1, wherein the third pitch is equal to the first pitch and the fourth pitch is equal to the second pitch.

7. The fastener of claim 1, wherein the surface segments on at least one of the torquing member and the clamping member form an undulating bearing surface.

8. The fastener of claim 1, wherein the torquing member exerts a clamp load on the clamping member as the torquing member is rotated onto a bolt; and
   the helically inclined surface segments on the torquing member and the clamping member are dimensioned so that the clamp load decreases while the helically inclined surface segments with the first pitch and the third pitch are in contact.

9. The fastener of claim 1, wherein the torquing member exerts a clamp load on the clamping member as the torquing member is rotated onto a bolt; and
   the helically inclined surface segments on the torquing member and the clamping member are dimensioned so that the clamp load increases while the helically inclined surface segments with the second pitch and the fourth pitch are in contact.

10. The fastener of claim 1, wherein the torquing member exerts a clamp load on the clamping member as the torquing member is rotated onto a bolt; and
    the helically inclined surface segments on the torquing member and the clamping member are dimensioned so that the clamp load alternates between being increased and being decreased during rotation of the torquing member onto the bolt.

11. The fastener of claim 1, wherein a torque angle required to traverse the first pitch and the second pitch is less than a torque angle required to traverse the second pitch and fourth pitch.

12. The fastener of claim 1, wherein contact between the first pitch and the third pitch resist loosening of the fastener.

13. A fastener assembly comprising:
    a torquing member and a clamping member assembled on a common axis;
    the torquing member comprises:
    threads that are provided with a predetermined pitch and that are located around the axis;
    an annular bearing surface extending around the axis on one end;
    the clamping member comprises an annular bearing surface extending around the axis on one end and facing the torquing member bearing surface;
    the annular bearing surface on the torquing member comprises a first series of helically inclined surface segments and a second series of helically inclined surface segments, wherein the torquing member surface segments of the first series are provided with a pitch that is greater than the predetermined pitch on the threads and the torquing member surface segments of the second series are provided with a pitch that is different than the predetermined pitch and inclined in the opposite direction; and
    the annular bearing surface on the clamping member comprises a third series of helically inclined surface segments and a fourth series of helically inclined surface segments, wherein the clamping member surface segments of the third series are provided with a pitch that is substantially greater than the predetermined pitch on the threads, and the clamping member surface segments of the fourth series are provided with a pitch that is different than the predetermined pitch and inclined in the opposite direction.

14. The fastener of claim 13, wherein the helically inclined surface segments of the first series alternate with the helically inclined surface segments of the second series in the annular bearing surface on the torquing member; and
    the helically inclined surface segments of the third series alternate with the helically inclined surface segments of the fourth series in the annular bearing surface on the clamping member.

15. The fastener of claim 13, wherein the first and second series of helically inclined surface segments in the torquing member bearing surface are equal in number to each other.

16. The fastener of claim 15, wherein the third and fourth series of helically inclined surface segments in the clamping member bearing surface are equal in number to each other.

17. The fastener of claim 13, wherein the annular bearing surface on the torquing member exerts a clamp load on the annular bearing surface on the clamping member during rotation of the torquing member onto a bolt; and
    the annular bearing surface on the torquing member and the annular bearing surface on the clamping member are shaped so that the clamp load alternates between being increased and being decreased during rotation of the torquing member onto the bolt.

18. A fastener assembly comprising:

a bolt with a head and a shaft;

a washer assembled on the shaft;

the bolt comprising threads formed around a portion of the shaft;

the head comprising a plurality of helically inclined surface segments located on an underside of the head, wherein the head surface segments include a first pitch that is greater than a pitch on the threads and the head surface segments include a second pitch with opposite incline relative to the threads;

the washer comprising a bearing surface facing the underside of the head, the washer bearing surface comprising a plurality of helically inclined surface segments, wherein the washer surface segments include a third pitch that is greater than the pitch on the threads and the washer surface segments include a fourth pitch with opposite incline relative to the threads.

19. The fastener of claim 18, wherein the bolt exerts a clamp load on the washer as the bolt is rotated into a threaded member;

the helically inclined surface segments on the bolt and the washer are dimensioned so that the clamp load decreases while the helically inclined surface segments with the first pitch and the third pitch are in contact; and the helically inclined surface segments on the bolt and the washer are dimensioned so that the clamp load increases while the helically inclined surface segments with the second pitch and the fourth pitch are in contact.

20. The fastener of claim 18, wherein the bolt exerts a clamp load on the washer as the bolt is rotated into a threaded member;

the helically inclined surface segments on the bolt and the washer are dimensioned so that the clamp load alternates between being increased and being decreased during rotation of the bolt into the threaded member.

* * * * *